United States Patent
Collins et al.

(10) Patent No.: US 7,445,300 B2
(45) Date of Patent: Nov. 4, 2008

(54) CHARGING CABINET

(75) Inventors: Stephen Collins, Lakewood, CO (US);
Suzzane Collins, Lakewood, CO (US)

(73) Assignee: Labyrinth Worldwide, LLC, Lakewood, CO (US)

(*) Notice: Subject to any disclaimer, the term of this patent is extended or adjusted under 35 U.S.C. 154(b) by 38 days.

(21) Appl. No.: 11/390,739

(22) Filed: Mar. 28, 2006

(65) Prior Publication Data
US 2007/0249196 A1  Oct. 25, 2007

(51) Int. Cl.
*A47B 97/00* (2006.01)
(52) U.S. Cl. .............. 312/249.8; 320/107; 320/111
(58) Field of Classification Search .......... 320/104, 320/105, 107, 111, 112, 114, 116; 429/97, 429/100; 290/1 R; 307/11, 150
See application file for complete search history.

(56) References Cited

U.S. PATENT DOCUMENTS

| | | | | |
|---|---|---|---|---|
| 2,473,194 A * | 6/1949 | Chou | ........................... | 307/150 |
| 4,792,881 A * | 12/1988 | Wilson et al. | ................ | 361/827 |
| 5,191,276 A * | 3/1993 | Zainaleain | ................... | 320/110 |
| 5,689,171 A * | 11/1997 | Ludewig | ...................... | 320/110 |
| 6,218,796 B1 * | 4/2001 | Kozlowski | ................... | 318/280 |
| 6,382,749 B1 * | 5/2002 | Stetson | ......................... | 312/308 |
| 6,400,121 B1 * | 6/2002 | Tracey | .......................... | 320/104 |
| 7,111,852 B2 * | 9/2006 | Woods et al. | ............. | 280/47.34 |
| 2003/0128507 A1 * | 7/2003 | Metcalf | ....................... | 361/686 |
| 2003/0141840 A1 * | 7/2003 | Sanders | ....................... | 320/107 |
| 2004/0000815 A1 * | 1/2004 | Pereira | ......................... | 307/11 |
| 2004/0164704 A1 * | 8/2004 | Yang | ........................... | 320/104 |
| 2005/0164545 A1 * | 7/2005 | Rosenthal et al. | ........... | 439/501 |
| 2005/0164704 A1 * | 7/2005 | Winsor | ..................... | 455/432.3 |
| 2005/0242690 A1 * | 11/2005 | Perkins et al. | ............ | 312/249.9 |
| 2006/0087122 A1 * | 4/2006 | Sheffield | .................... | 290/1 R |
| 2006/0179458 A1 * | 8/2006 | Schmieder et al. | ............ | 725/78 |
| 2007/0058344 A1 * | 3/2007 | Baker | .......................... | 361/695 |
| 2007/0120451 A1 * | 5/2007 | Lamar | ........................ | 312/227 |

OTHER PUBLICATIONS

ReSource, Inc., ReSource®, Power Station Product Brochure, 2004.
ReSource, Inc., ReSource Solutions for Better Living Product Brochure, 2006.

\* cited by examiner

*Primary Examiner*—Akm Enayet Ullah
*Assistant Examiner*—M'Baye Diao
(74) *Attorney, Agent, or Firm*—McDonnell Boehnen Hulbert & Berghoff, LLP

(57) ABSTRACT

An exemplary embodiment of the present invention has been described above. Those skilled in the art will understand, however, that changes and modifications may be made to this embodiment without departing from the true scope and spirit of the present invention, which is defined by the claims.

24 Claims, 3 Drawing Sheets

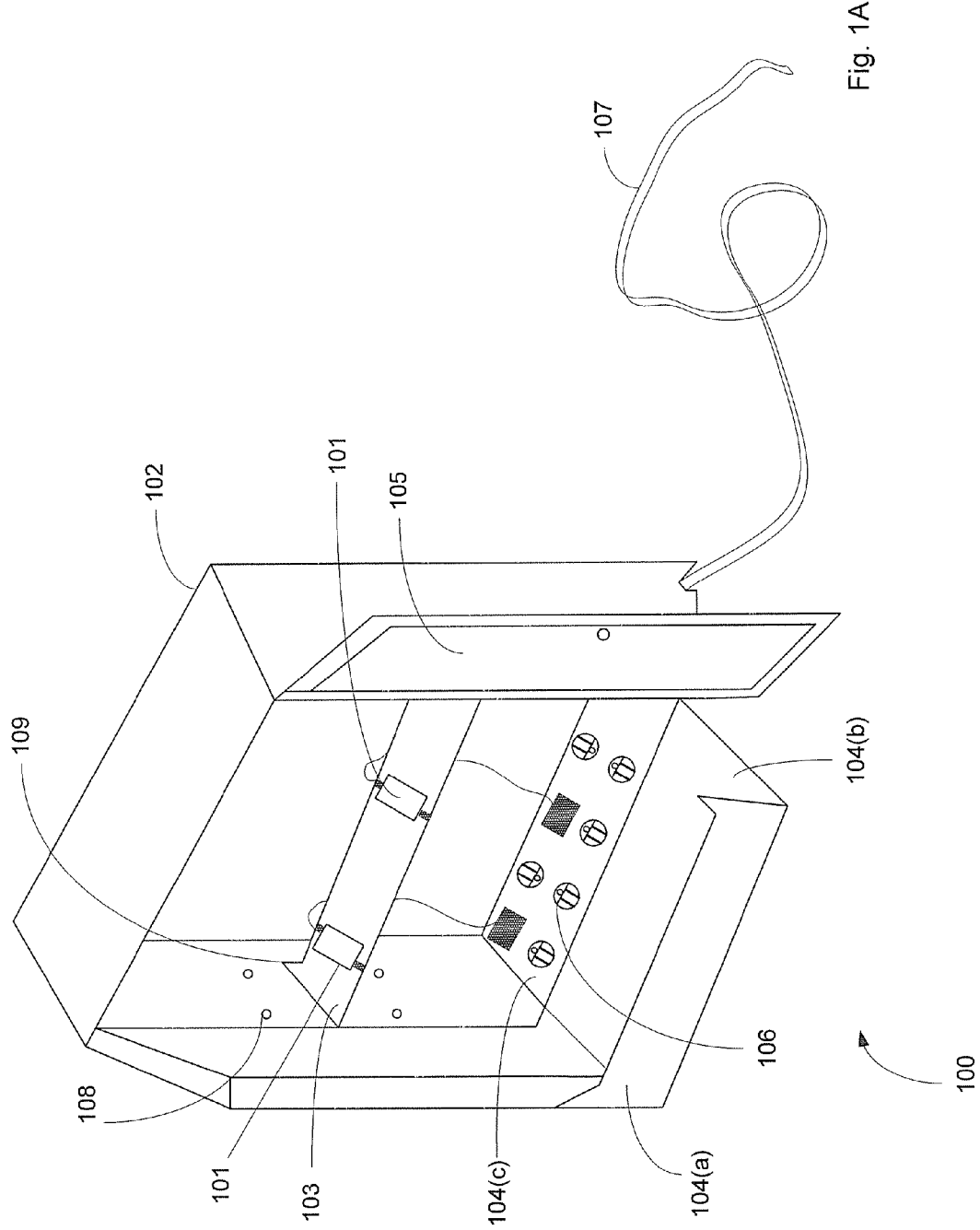

CHARGING CABINET

BACKGROUND

1. Field of the Invention

This invention relates to storage cabinets.

2. Description of Related Art

Small electronic devices have grown to replace many of the older, bulkier devices consumers were accustomed to using. The smaller electronic devices are popular not only because of their smaller size and lighter weight, but also because they are portable, allowing consumers to take and use them anywhere—be it at home, at work, on vacation, in the car, etc. Due to the ever-popular portability of such small electronic devices, it is often the case that consumers use or carry several such devices at the same time. For example, a consumer may carry a cellular telephone, a personal digital assistant ("PDA"), and an iPod® music player, all at the same time. Similarly, consumers may have some or all such devices at their desks at work. Further, at home, a user may have all previously mentioned devices plus an electric toothbrush and an electric shaving razor, to name a couple. Other examples of such electronic devices are GameBoys® hand-held video games, digital cameras, and other similar devices.

Because small electronic devices are so popular, it has also become common for a household to have multiple quantities of the same device. Each electronic device usually comes with its own charger requiring a power outlet. Thus, charging multiple electronic devices through different outlets necessitates that consumers dedicate multiple power outlets to the devices. If a household or office does not have enough outlets in any one room, then a consumer may have to distribute the devices throughout several rooms. Distributing the devices throughout several rooms for the purpose of charging them is inefficient at least from the perspective of having to go to different rooms when it is time to use or collect one or more of the devices. Additionally, the cords that connect a device to a power outlet are often long and may impede traffic, creating safety concerns. Finally, having multiple cords in an area results in unsightly and dangerous clutter.

The more savvy users may utilize power strips to limit the number of dedicated power outlets and to select a convenient spot to charge a particular electronic device. However, this alternative still results in unnecessary clutter and the cords may still create safety concerns. Furthermore, storing and charging multiple electronic devices on a kitchen or bathroom counter, desk, or elsewhere significantly reduces the counter's or desk's usable space, further creating unsightly clutter.

Accordingly, it would be desirable to be able to minimize the safety concerns, the number of power outlets used, and the clutter associated with storing and charging multiple electronic devices.

SUMMARY OF THE INVENTION

The present invention provides a charging cabinet for holding and charging small electronic devices. Such a charging cabinet will have at least one shelf on which users may place small electronic devices, a housing to contain the at least one shelf, a plurality of power outlets that will deliver power to the devices, and a cord that plugs into an external power source and delivers power to the internal power outlets.

Using such charging cabinets will provide users with a way to charge and store multiple small electronic devices without dedicating valuable desk or counter space, or multiple household power outlets to the devices. Using a charging cabinet will also eliminate clutter created by multiple small electronic devices being stored or charged on a desk or on a counter in a kitchen or bathroom, for example. Additionally, the charging cabinet will eliminate the safety concerns of loose power cords by allowing them to be contained inside the charging cabinet.

Thus, in one respect an exemplary embodiment may be in the form of a device for charging a plurality of electronic objects. The device may comprise a housing having at least one shelf for holding the plurality of electronic objects, a plurality of power outlets, the plurality of power outlets for delivering power to the plurality of electronic objects, wherein the plurality of power outlets is built into the at least one shelf, and a means for delivering power to the plurality of power outlets.

Alternatively, an embodiment of the charging cabinet may comprise a frame having at least one shelf for holding a plurality of electronic objects, a plurality of power outlets for delivering power to the plurality of electronic objects, and a power cord for delivering electronic power to the plurality of power outlets.

These as well as other aspects and advantages of the present invention will become apparent to those of ordinary skill in the art by reading the following detailed description, with appropriate reference to the accompanying drawings.

BRIEF DESCRIPTION OF THE DRAWINGS

FIGS. 1A and 1B are diagrams of a charging cabinet in accordance with an exemplary embodiment.

DETAILED DESCRIPTION OF EXEMPLARY EMBODIMENTS

Figure 1B:
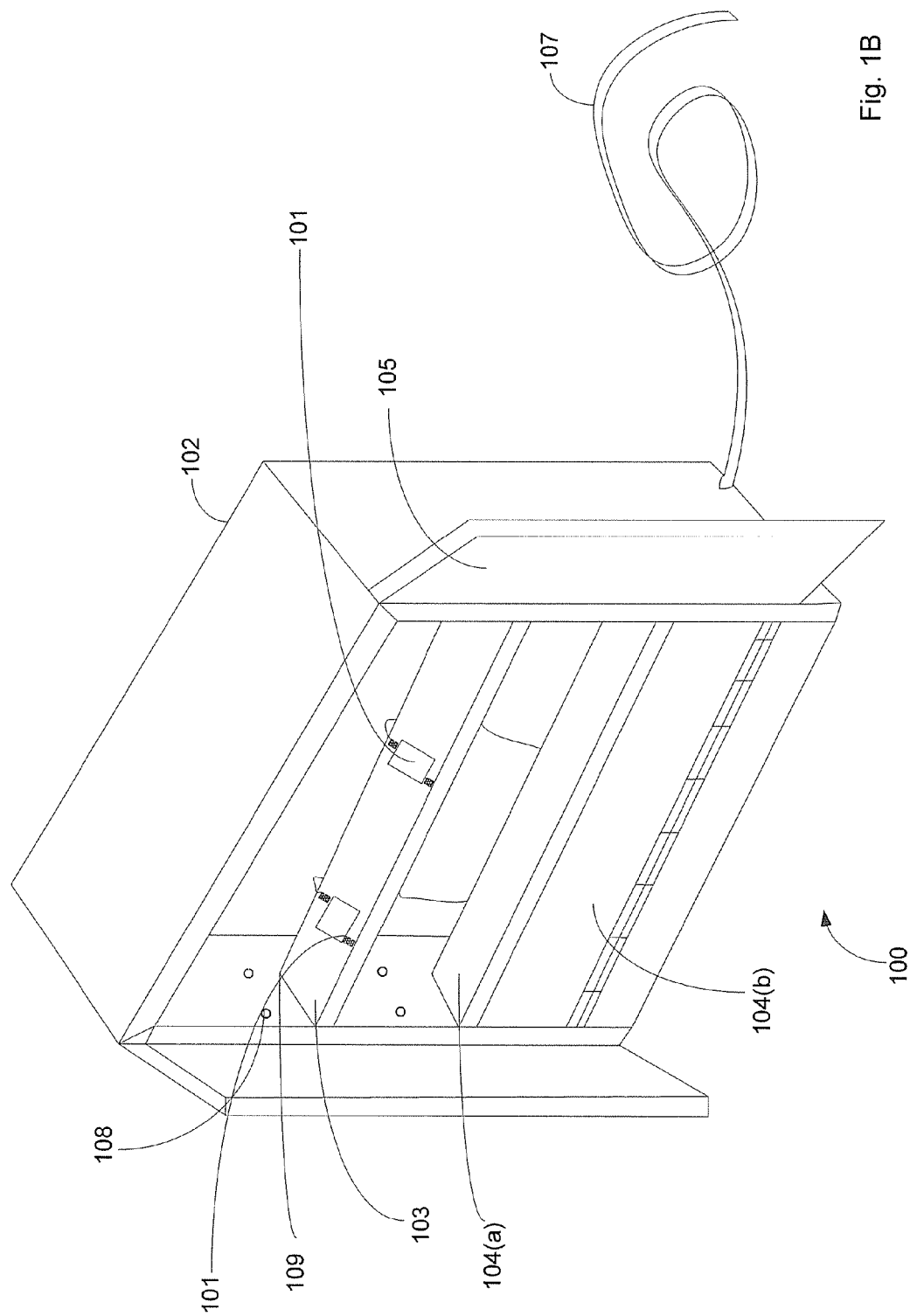

Referring to the drawings, FIG. 1A illustrates a charging cabinet in accordance with an exemplary embodiment. It should be understood, however, that this and other arrangements shown and described herein are exemplary only, and that many variations are possible. For instance, various elements could be combined, distributed, added, or omitted.

As generally illustrated in FIG. 1A, charging cabinet 100 includes electronic devices 101, housing 102, shelf 103, shelf 104, doors 105, power outlets 106, power cord 107, and ventilation outlets 108. Electronic devices 101 may be cellular telephones, personal digital assistants ("PDA"), iPod® music players, electronic toothbrushes, electronic razors, digital cameras, GameBoy® hand-held video games, or other similar devices. The charging cabinet 100 may house or charge a multitude of such devices at a time. The charging cabinet may house or charge a plurality of homogenous devices. Alternatively, the devices may be heterogeneous. Housing 102 may be made from wood, metal, wood veneer, laminate, plastic, glass, cardboard, leather, aluminum, for example, or from other suitable material. Furthermore, housing 102 may be mounted on a wall, built flush into a wall, sit on the top of a desk or counter, or be built into another object, such as a car or truck, for example. Housing 102 illustrated in FIG. 1A shows an embodiment that is mountable on a wall.

FIG. 1A also illustrates shelves 103 and 104 inside charging cabinet 100. The shelves may be made from any material used for housing 102 or other suitable materials. As further illustrated in FIG. 1A, the shelves in the charging cabinet may generally resemble cabinet shelves, as for example, shelf 103. The shelves may also swing in and out, as illustrated by shelf 104 in FIGS. 1A and 1B. One or both kinds of shelves may be implemented in a charging cabinet. For example, a charging cabinet may have one or more shelves 103, one or more shelves 104, or one or more of each kind of shelf. An exemplary charging cabinet illustrated in FIGS. 1A and 1B has just one of each kind of shelf. The alternative embodiment illustrated in FIG. 2 has just one shelf 203, which is equivalent to shelf 103 in FIGS. 1A and 1B.

Referring back to FIG. 1A, shelf 103 is preferably adjustable, in that it slides in and out of charging cabinet 100. Thus, a consumer could pull shelf 103 forward when placing electronic devices 101 on the shelf, and then slide the shelf back in position. This may be achieved in a variety of ways. For example, housing 102 may have brackets in the sidewalls. The brackets could both support a shelf and allow the shelf to move forward and back. To that end, the brackets may be roller brackets that would allow a shelf to slide forward and back. Alternatively, the brackets may be flat-sided. Additionally, the shelves, the brackets, or both may have a stopping mechanism that prevents a shelf from being pulled completely out of a charging cabinet. Elements other than brackets may ultimately be used to facilitate a shelf's sliding movement. For example, a charging cabinet may, instead, have special ridges or rails that would permit that same movement.

It is also preferable that shelf 103 is vertically adjustable, allowing a user to customize the shelf's height in the charging cabinet. The height of a bracket that supports shelf 103 could determine the height of shelf 103. There could be several such brackets at varying heights in the sidewalls of housing 102. Other techniques may also be implemented to control the height of a shelf inside housing 102. For example, the ridges or rails described above, or other similar mechanisms could achieve the same purpose.

FIG. 1A also illustrates shelf 104, which, in turn, is made up of components 104 (*a*), 104 (*b*), and 104 (*c*). Component 104 (*a*) is the top section of shelf 104. That is where electronic devices 101 may lie when being stored and/or charged. Component 104 (*b*) is the front section or the face plate of shelf 104. Component 104 (*c*) is the bottom section of shelf 104. That is where power outlets 106 may be installed. Component 104 (*c*) may also serve as the floor of charging cabinet 100.

Components 104 (*c*) and 104 (*b*) are preferably connected by a hinge mechanism that allows component 104 (*b*) to swing. FIG. 1A illustrates shelf 104 in the swung-out position, whereas FIG. 1B illustrates shelf 104 in a swung-in position. In accordance with an exemplary embodiment and as illustrated in FIG. 1B, when shelf 104 is in the swung-in position, power outlets 106 are not accessible or visible.

Components 104 (*a*) and 104 (*b*) are preferably connected by a structure or mechanism that secures the joint between the two components at a right angle. Alternatively, the joint may be flexible, and component 104 (*a*) may be held in place inside a charging cabinet by the brackets described above with reference to shelf 103. According to an exemplary embodiment in FIG. 1A, shelf 104 generally does not move. Preferably, its position inside charging cabinet 100 is fixed by the manufacturer of the charging cabinet. However, in an alternative embodiment, shelf 104 may be moveable.

Power outlets 106 may be installed on either side of component 104 (*c*). Referring to FIG. 1A, power outlets 106 may be installed facing up, toward shelf 103. Alternatively, in an embodiment that has additional shelves below shelf 104, power outlets 106 may be installed facing down, toward those additional shelves. In yet another alternative embodiment, when there are no additional shelves below shelf 104, some or all of the power outlets 106 may be installed to face outside the charging cabinet, and be accessible by electronic devices that are not inside the charging cabinet. Power outlets 106 may receive their power from a means that delivers power. In the present embodiment, such means is a power cord 107, which, in turn, may be connected to an external power source, such as a domestic or commercial power outlet, for example. Alternative means for delivering power to power outlets 106 may be a battery, solar plates capable of generating solar power, or other, similar means.

The charging cabinet 100 may also include a means for protecting the power outlets 106 from a power surge. Such means may be a surge protector, or another similar device. The charging cabinet 100 may also include an uninterrupted power supply to safeguard the charging cabinet against power fluctuations. Furthermore, the charging cabinet 100 may include a cable, a telephone, or another data port.

Also illustrated in FIG. 1A are grooves 109. According to the preferred embodiment illustrated in FIG. 1A, shelf 103 and component 104 (*a*) of shelf 104 each have a groove 109. Groove 109 provides space between shelf 103 or 104 and the back wall of housing 102. That space is where power cords connected to electronic devices 101 may pass. For example, in FIG. 1A electronic devices 101 lie on shelf 103. The cords from electronic devices 101 fall through groove 109 down to power outlets 106, where the power cords are plugged in.

In FIG. 1A, power outlets 106 are installed in component 104 (*c*). Electronic devices 101 are resting on shelf 103 and can be plugged into power outlets 106. Alternatively, electronic devices 101 may rest on component 104 (*a*) of shelf 104. In FIG. 1A, component 104 (*c*) does not have a groove because cords do not need to pass between it and the back wall of housing 102. Therefore, in an embodiment where component 104 (*c*) is the floor of a charging cabinet, or where shelf 104 is the lowest shelf in a charging cabinet, even if it is not the floor, component 104 (*c*) may not require groove 109. However, in an embodiment that has additional shelves below component 104 (*c*), component 104 (*c*) may, indeed, require groove 109.

Referring back to the figures, grooves 109 may be of varying sizes. The size depends on what kinds of devices are intended to be stored in a particular charging cabinet. For example, for a charging cabinet that stores and charges household electronics, the groove may only need to be one-half inch or one inch wide. However, a cabinet that is built into a truck's bed is likely to house larger electronic devices, and those devices might have larger cords. Thus, such a charging cabinet may have a need for a larger—two to six inch—grooves, for example.

Power outlets 106 illustrated in FIG. 1A are preferably standard 110 volt outlets. They may be spaced out in a pattern shown in FIG. 1A, or in another suitable pattern that will accommodate electronic devices. For example, the power outlets may be spaced wider apart, so as to accommodate electronic devices with large transformers. The power outlets may be built into the side walls of the housing 102 in addition to, or instead of, being built into shelf 103 or 104. Furthermore, in addition to the built in power outlets, a commercial power strip may be used.

In FIG. 1A, power outlets 106 are part of component 104 (*c*) of shelf 104. In another embodiment, there could be more shelves above and below shelf 104. Any number of shelves may ultimately be included in a charging cabinet, and the power outlets may be built into any of those shelves or into the housing.

The power outlets receive their electricity from a conventional power cord 107, which plugs into a household or office outlet, for example. Another version of power cord 107 may plug into a vehicular or other power outlet. Also illustrated in FIG. 1A are ventilation outlets 108. They allow the air inside housing 102 to circulate and help maintain a safe temperature. FIGS. 1A and 1B also show doors 105, which may, in turn, use any commercially available locking device such as, for example, a magnet, a push-lock, or other similar device. Other locking mechanisms may also be used.

While FIG. 1A illustrates charging cabinet 100 with shelf 104 in a swung out position, FIG. 1B illustrates charging cabinet 100 with shelf 104 in the swung-in position. As shown in FIG. 1B, when shelf 104 is in the swung-in position, power outlets 106 are not visible. Thus, the transformers and plugs of electronic devices 101 plugged into power outlets 106 also would not be visible.

Figure 2:
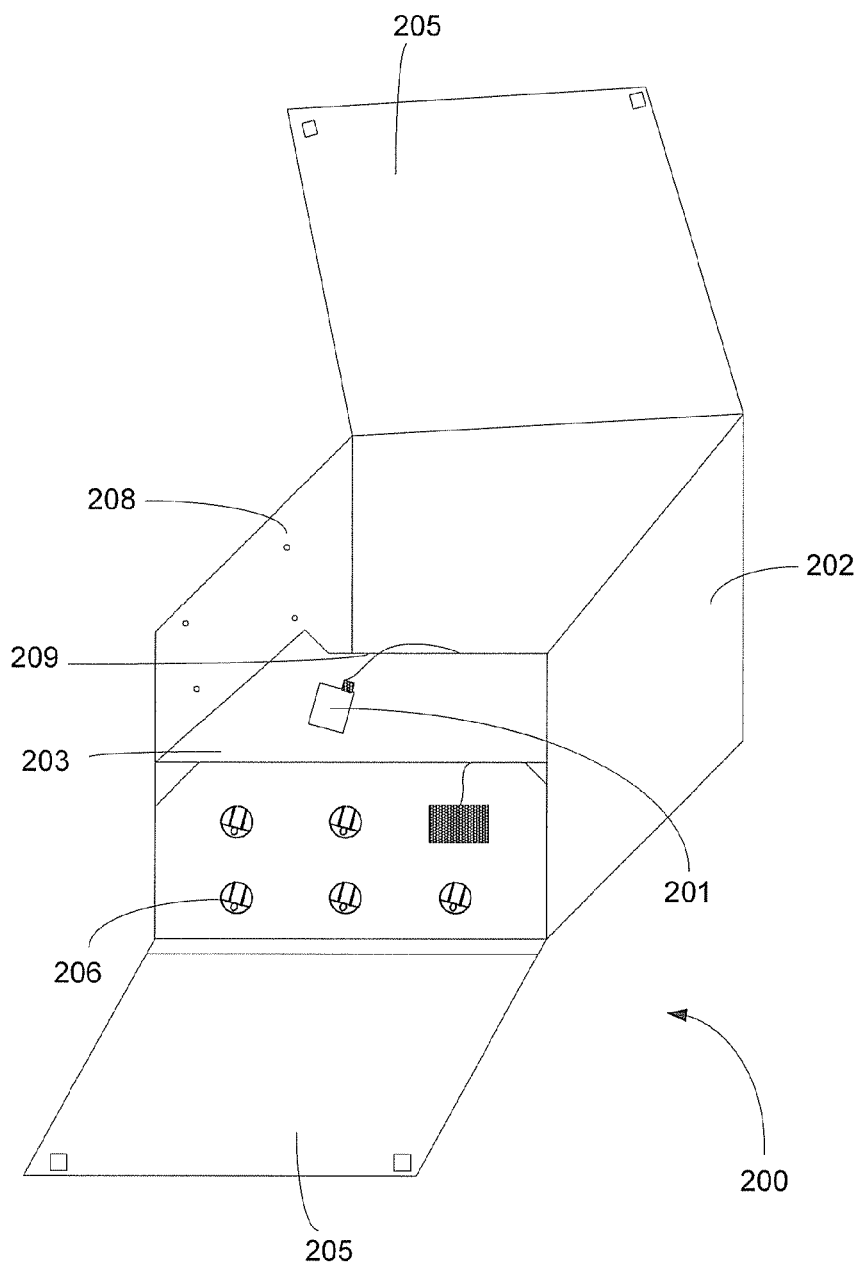
FIG. 2 is a diagram of an alternative embodiment of the charging cabinet.

FIG. 2 illustrates an alternative embodiment of the charging cabinet. In this embodiment, charging cabinet 200 may be shaped like a square, a circle, a rectangle, or any other shape, and be designed primarily to sit on top of a desk or counter. The housing may or may not have a lid on it. It may be like a box with a removable top or an attached top. It may also be shaped like a conventional jewelry box. If housing 202 has a lid, the lid may be attached to housing 202 with a hinge or another similar mechanism. In the embodiment illustrated in FIG. 2, lids 205 have magnets that enable charging cabinet 200 to close.

In this embodiment, the shelf 203 has a groove 209. Shelf 203 is preferably adjustable, in that it slides in and out of charging cabinet 200. Thus, a consumer could pull the shelf forward when placing electronic device 201 on it, and then slide the shelf back in position. As described above with reference to FIGS. 1A and 1B, this may be achieved in a variety of ways. For example, housing 202 may have brackets in the sidewalls. The brackets could both support a shelf and allow the shelf to be moved forward and back. To that end, the brackets may be roller brackets that would allow a shelf to slide forward and back. Alternatively, the brackets may be flat-sided. Additionally, the shelves, the brackets, or both may have a stopping mechanism that prevents a shelf from being pulled completely out of a charging cabinet. Elements other than brackets may ultimately be used to facilitate a shelf's sliding movement. For example, a charging cabinet may, instead, have special ridges or rails that would permit that same movement It is also preferable that shelf 203 is vertically adjustable, allowing a user to customize the shelf's height in the charging cabinet. The height of a bracket that supports a shelf could determine the height of the shelf. There could be several such brackets at varying heights in the sidewalls of housing 202. Other techniques may also be implemented to control the height of a shelf inside housing 202. For example, as previously mentioned with reference to FIGS. 1A and 1B, the ridges, rails, or other similar mechanisms could achieve the same purpose.

Shelf 203 also has a groove 209 that allows the cords to fall to the power outlets 206 below it. Thus, a user may pull shelf 203 forward, plug electronic device 201 into one of power outlets 206, push shelf 203 back into place—above the power outlets—and place electronic device 201 on shelf 203 for storage. Finally, housing 202 also has ventilation outlets 208. They allow for the air to circulate through the charging cabinet, thereby maintaining a safe temperature.

We claim:

1. A device for charging a plurality of electronic objects, the device comprising:
    a housing having at least one shelf for holding the plurality of electronic objects;
    a plurality of power outlets, the plurality of power outlets for delivering power to the plurality of electronic objects, the plurality of power outlets built into a bottom section of a second shelf, the second shelf comprising a top section, a front section, and the bottom section, in which the top section can serve as a third shelf, and in which the bottom section is connected to the front section by a hinged mechanism, the top section and the front section being connected by a mechanism that secures the top section to the front section at a right angle from each other; and
    a means for delivering power to the plurality of power outlets.

2. The device of claim 1, further comprising a locking mechanism.

3. The device of claim 1, wherein the means for delivering power to the plurality of power outlets is a power cord.

4. The device of claim 1, wherein at least some of the plurality of power outlets face inside the housing.

5. The device of claim 1, wherein at least some of the plurality of power outlets face outside the housing.

6. The device of claim 1, wherein the top section and the front section are connected to each other by a flexible joint.

7. The device of claim 1, further comprising a means for protecting the plurality of power outlets from a power surge.

8. The device of claim 1, further comprising an uninterrupted power supply.

9. The device of claim 1, wherein the at least one shelf has a groove that creates a space between the at least one shelf and the housing.

10. The device of claim 9, wherein the groove allows cords to pass between the at least one shelf and the housing.

11. The device of claim 1, wherein the at least one shelf moves in at least one direction.

12. The device of claim 1, further comprising at least one ventilation mechanism.

13. A charging cabinet comprising:
    a frame having at least one shelf for holding a plurality of electronic objects and a second shelf comprising a bottom section, a front section, and a top section, in which the top section can serve as a third shelf, and in which the bottom section is connected to the front section by a hinged mechanism, the top section and the front section being connected by a mechanism that secures the top section to the front section at a right angle from each other;
    a plurality of power outlets for delivering power to the plurality of electronic objects, the plurality of power outlets built into the bottom section; and
    a power cord for delivering electronic power to the plurality of power outlets.

14. The charging cabinet of claim 13, wherein the frame farther comprises a locking mechanism.

15. The charging cabinet of claim 13, wherein at least some of the plurality of power outlets faces inside the charging cabinet.

16. The charging cabinet of claim 13, wherein at least some of the plurality of power outlets faces outside the charging cabinet.

17. The charging cabinet of claim 13, wherein the at least one shelf moves in at least one direction.

18. The charging cabinet of claim 13, wherein the at least one shelf has a groove that creates a space between the at least one shelf and the frame.

19. The charging cabinet of claim 13, further comprising at least one ventilation mechanism.

20. The charging cabinet of claim 13, further comprising a means for protecting the plurality of power outlets from a power surge.

21. The charging cabinet of claim 13, further comprising an uninterrupted power supply.

22. The device of claim 1, wherein the top section and the front section can be moved to a swing-in position where the plurality of power outlets are not accessible, and in the swing-in position, the top section is substantially parallel to the bottom section.

23. The device of claim 1, wherein the top section and the front section can be moved to a swing-out position where the plurality of outlets are not accessible, and in the swing-out position, the top section is substantially perpendicular to the bottom section.

24. The device of claim 1, wherein the bottom section serves as a floor of the device.

* * * * *